(12) United States Patent
Cueli et al.

(10) Patent No.: US 10,445,741 B2
(45) Date of Patent: Oct. 15, 2019

(54) TRANSACTION OVERRIDES

(75) Inventors: Allen Cueli, Miami Lakes, FL (US); Lori D. VanDeloo, Los Altos, CA (US)

(73) Assignee: Visa International Service Association, San Francisco, CA (US)

( * ) Notice: Subject to any disclaimer, the term of this patent is extended or adjusted under 35 U.S.C. 154(b) by 0 days.

(21) Appl. No.: 13/357,510

(22) Filed: Jan. 24, 2012

(65) Prior Publication Data

US 2013/0024289 A1 Jan. 24, 2013

Related U.S. Application Data

(60) Provisional application No. 61/435,771, filed on Jan. 24, 2011.

(51) Int. Cl.
| | |
|---|---|
| *G06Q 30/00* | (2012.01) |
| *G06Q 20/02* | (2012.01) |
| *G06Q 20/04* | (2012.01) |
| *G06Q 20/12* | (2012.01) |
| *G06Q 30/02* | (2012.01) |

(52) U.S. Cl.
CPC ........... *G06Q 30/00* (2013.01); *G06Q 20/027* (2013.01); *G06Q 20/0453* (2013.01); *G06Q 20/12* (2013.01); *G06Q 30/02* (2013.01)

(58) Field of Classification Search
CPC .. G06Q 20/20; G06Q 20/227; G06Q 20/3572; G06Q 20/405; G06Q 20/425; G06Q 20/10; G06Q 20/04; G06Q 20/02
See application file for complete search history.

(56) References Cited

U.S. PATENT DOCUMENTS

| | | |
|---|---|---|
| 2001/0039535 A1 | 11/2001 | Tsiounis et al. |
| 2002/0026395 A1 | 2/2002 | Peterson |
| 2002/0062249 A1 | 5/2002 | Iannacci |
| 2002/0065839 A1 | 5/2002 | McCulloch |

(Continued)

FOREIGN PATENT DOCUMENTS

| | | |
|---|---|---|
| KR | 10-2002-0006189 A | 1/2002 |
| KR | 10-2009-0004833 A | 1/2009 |

(Continued)

OTHER PUBLICATIONS

International Search Report for PCT/US2012/022414 dated Aug. 9, 2012. 10 pages.

(Continued)

*Primary Examiner* — Namrata Boveja
*Assistant Examiner* — Carol A See
(74) *Attorney, Agent, or Firm* — Kilpatrick Townsend & Stockton LLP

(57) ABSTRACT

Systems and methods are presented for payment transaction overrides and system initiated payment splitting. In one embodiment, a first authorization request associated with a first account is monitored at an override computer, an override trigger is identified, and a transaction override approval is received. Override authorization requests are then sent, and responses to the override authorization requests are received at the override computer. A response to the initial authorization request is the sent based on the response received to the override authorization request. In alternative embodiments the override requests are cascaded, or include requests for new account creation.

15 Claims, 11 Drawing Sheets

(56) References Cited

U.S. PATENT DOCUMENTS

| | | |
|---|---|---|
| 2002/0082920 A1 | 6/2002 | Austin et al. |
| 2003/0126075 A1* | 7/2003 | Mascavage, III ...... G06Q 20/02 705/39 |
| 2003/0126094 A1* | 7/2003 | Fisher et al. ..................... 705/75 |
| 2003/0182204 A1 | 9/2003 | Rhee |
| 2005/0283279 A1 | 12/2005 | Cleeves et al. |
| 2006/0131390 A1* | 6/2006 | Kim ...................... G06Q 20/24 235/380 |
| 2006/0212407 A1 | 9/2006 | Lyon |
| 2006/0258397 A1 | 11/2006 | Kaplan et al. |
| 2006/0259390 A1* | 11/2006 | Rosenberger .......... G06Q 20/04 705/35 |
| 2007/0106558 A1* | 5/2007 | Mitchell ............ G06Q 20/0453 705/16 |
| 2007/0125840 A1 | 6/2007 | Law et al. |
| 2007/0150566 A1 | 6/2007 | Lamparello et al. |
| 2008/0133351 A1* | 6/2008 | White et al. ..................... 705/14 |
| 2008/0154704 A1 | 6/2008 | Flake et al. |
| 2009/0090783 A1* | 4/2009 | Killian et al. ................. 235/492 |
| 2009/0099961 A1 | 4/2009 | Ogilvy |
| 2009/0254944 A1 | 10/2009 | Watson et al. |
| 2009/0265249 A1* | 10/2009 | Bishop ................... G06Q 20/02 705/21 |
| 2009/0271262 A1* | 10/2009 | Hammad ............... G06Q 20/04 705/14.33 |
| 2010/0174562 A1 | 7/2010 | Siepser |
| 2010/0257066 A1 | 10/2010 | Jones et al. |
| 2010/0299217 A1 | 11/2010 | Hui |
| 2010/0306015 A1* | 12/2010 | Kingston ........... G06Q 10/1093 705/7.18 |
| 2010/0332265 A1 | 12/2010 | Smith |
| 2011/0166922 A1 | 7/2011 | Fuerstenberg |
| 2011/0191149 A1* | 8/2011 | Blackhurst ........... G06Q 20/102 705/14.1 |
| 2011/0251892 A1* | 10/2011 | Laracey ..................... 705/14.51 |
| 2012/0239477 A1 | 9/2012 | Cueli et al. |

FOREIGN PATENT DOCUMENTS

| | | |
|---|---|---|
| KR | 10-2009-0122321 A | 11/2009 |
| KR | 10-2010-0036468 A | 4/2010 |
| WO | 2004012036 A2 | 2/2004 |

OTHER PUBLICATIONS

International Search Report and Written Opinion in PCT/2012/022440, dated Aug. 30, 2012, 8 pages.
Office Action dated Apr. 12, 2013 in U.S. Appl. No. 13/357,474, 24 pages.
Nambiar, S., et al., "Analysis of Payment Transaction Security in Mobile Commerce," 2004 IEEE, pp. 475-480.
Office Action dated Sep. 26, 2013 in U.S. Appl. No. 13/357,474, 17 pages.
Non-Final Office Action dated Apr. 8, 2015 in U.S. Appl. No. 13/357,474, 15 pages.
Final Office Action dated Aug. 21, 2015 for U.S. Appl. No. 13/357,474, 22 pages.

* cited by examiner

TRANSACTION OVERRIDES

CROSS-REFERENCES TO RELATED APPLICATIONS

The present application claims benefit under 35 U.S.C. § 119(e) of U.S. Provisional Patent Application No. 61/435,771, entitled "Portable Device Data management," filed Jan. 24, 2011, the entire disclosure of which are incorporated herein by reference for all purposes.

BACKGROUND

The present innovations related to transaction splitting in an electronic payment network.

In certain electronic payment processing systems, functionality is included to enable a user to identify multiple accounts and/or multiple methods of payment prior to communicating an authorization requests for an electronic payment. These systems essentially allow a user to initiate multiple partial payments at a point of sale. While such systems enable additional consumer flexibility in making payments, improved systems and methods for payment splitting may provide an improved process.

BRIEF SUMMARY

Certain embodiments according to non-limiting aspects of the innovations presented herein describe transaction overrides that may function to implement user approved transaction splitting. The user approval may occur prior to an initial authorization request, or may occur as an alert and response in conjunction with an override of an initial single authorization request from the user.

One potential embodiment involves monitoring, at a transaction override computer, a first authorization request associated with a first account. A user override preference is compared with the first authorization request to identify an override trigger. Following the identification of an override trigger, the system receives a transaction override approval to continue the override process. The system transmits a transaction override authorization request in response to the transaction override approval and receives a response to the transaction override authorization request. Finally, the system transmits a response to the first authorization request based on the response to the transaction override authorization request Various other alternative embodiments may involve transmitting, from the transaction override computer to a mobile phone associated with the first account, a request for a transaction override approval via an alert module in response to receipt of the override trigger at the payment processing network; systems where the override trigger comprises the transaction override approval, and systems where the transaction override authorization request comprises a first partial payment request associated with the first account and a first issuer and a second partial payment request associated with a second account and a second issuer.

Another potential alternative embodiment of the present innovations comprises a method where a first authorization request is received at a transaction override computer. The method involves identifying, at the transaction override computer, an override trigger; identifying, at the transaction override computer, a transaction override approval; and analyzing a second account that is different than the first account to determine a response to the first authorization request. A response to the first authorization request based at least in part on the analyzing of the second account is then transmitted by the transaction override computer.

Additional further embodiments include receiving, at the transaction override computer, a registration request associated with the first account; and receiving, at the transaction override computer, the transaction override approval associating the first account with the second account as part of a registration account setting; and storing, in a database, the transaction override approval.

Further embodiments involve identifying, at the transaction override computer, a transaction override approval comprises communicating a search request to the database and receiving a search response from the database indicating that the database contains the transaction override approval; systems where the registration trigger setting received by the transaction override computer comprises a set of instructions to override a transaction when payment amount exceeds a predetermined threshold and the second account is created in response to the override trigger, and wherein the second account is an installment payment account.

An additional further embodiment involves a method of transmitting, from a point of sale device, a payment authorization request via a first communication path. A request for a transaction override approval is then received at the point of sale device via a second communication path that is different than the first communication path. The point of sale device then transmits a response to the transaction override request and receives, a response to the payment authorization request, where the response to the payment authorization request is based at least in part on the response to the transaction override request.

DETAILED DESCRIPTION

Figure 1A:
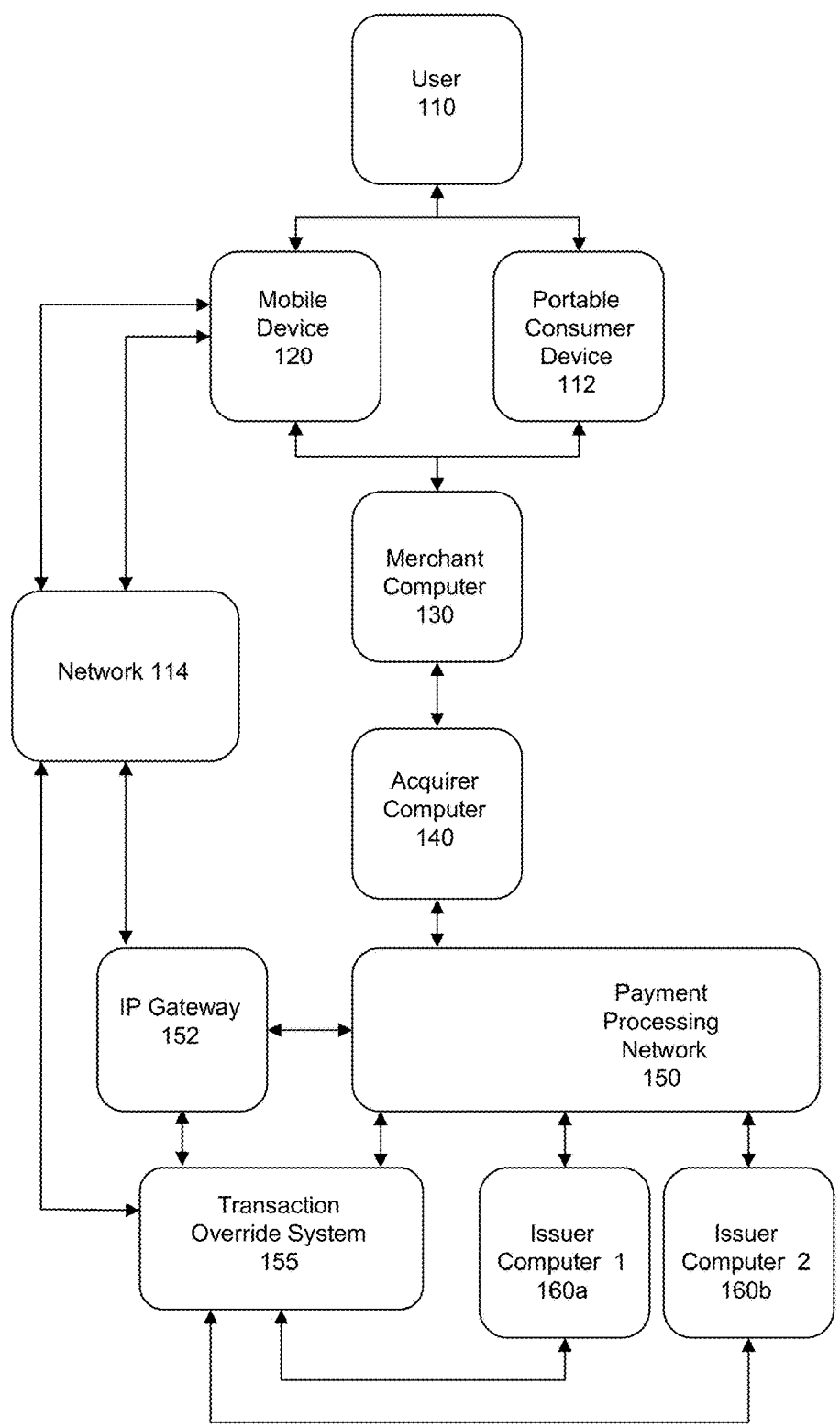
FIG. 1A shows a system, according to one potential embodiment of the innovations herein.

Embodiments of the innovations disclosed herein include systems and methods for providing an enhanced payment processing network. Embodiments may further include including functionality for processing transaction overrides. Still further embodiments may include payment network initiated payment splitting for users registered with an override system. In alternative embodiments, users registered in such an override system may provide preapproval for system overrides, or may request override request messages which the user may respond to for override authorization. Although embodiments will be illustrated with reference to specific implementations, a person of ordinary skill in the art will understand that these implementations describe innovations which may have broad use other than the specifically described implementations. As described below, an enhanced payment processing network may comprises systems and methods for splitting payments between accounts, splitting payments across multiple issuers, splitting payments in a cascaded fashion, or other payment splitting functionality.

Such a system may enable a payment processing network to respond to a payment request associated with a single account with an option to split the payment between multiple accounts when the amount available from the single account is insufficient for the entire purchase. Alternately, such a system may enable a payment processing network to cascade approvals for multiple accounts by sequentially requesting partial payment from different accounts and responding with an approval or rejection in a way that is transparent to the merchant and/or the user at the point of sale in certain embodiments.

For example, in one potential embodiment of an enhanced payment processing network, a user presents a credit card associated with a first user account to a merchant as part of a purchase. The merchant submits transaction information to the payment processing network as part of a payment request. In a standard payment process, the merchant will receive either an approval or denial of the payment request. In an enhanced payment processing network, the payment processing network may have information related to other accounts associated with the user. In response to the transaction request, the enhanced payment processing network may communicate to the user an alternate payment option whereby only a portion of the payment is made from the original account. If the user approves the alternate payment arrangement, the merchant is informed that the transaction has been approved.

The many potential alternative embodiments have technical advantages over known systems. Advantages may include improved security over systems where splitting occurs at the point of sale, as fewer account details are communicated over vulnerable communication pathways when transaction splitting is initiated by the payment network. Additional advantages may include lower usage of communication pathways between the merchant and the payment processing network, and faster end approval where an initial request is unable to be approved by the system. Additional advantages may include integration and interoperability between systems and accounts from multiple issuers in a way that is presented as transparent to end point users. In some embodiments, a system for upgrading or altering user account usage and specific user accounts without requiring changes in the transaction process by the user may provide additional technical advantages.

Further advantages include an improved consumer experience for transactions that are initially denied, such that users avoid the experience of having a merchant communicate a denial of an authorization request. In certain embodiments, users may be able to take advantage of new account opening benefits at the time of purchase through a preapproval process. Other additional advantages may include improved ability to manage risk and offer increased total balances to users by single issuers such that multiple accounts with increasing levels of cost may be managed for a single user.

FIG. 1 illustrates a system 100 for performing an electronic payment transaction in conjunction with a user according to an embodiment of the invention. System 100 includes user 110, portable consumer device 112, mobile device 120, portable consumer device 112, merchant computer 130, acquirer computer 140, payment processing network 150, IP gateway 152, transaction override system 155, and issuer computers 160.

According to various embodiments of FIG. 1. User 110 interacts with merchant 130 using the portable consumer device 112. Merchant computer 130 is in communication with acquirer computer 140. Acquirer computer 140 is in communication with issuer computer 160 through payment processing network 150. Issuer 160 and payment processing network 150 are in communication with transaction override system 170 to enable transaction override functionality.

User 110 refers to an individual or organization such as a business that is capable of purchasing goods or services or making any suitable payment transaction with merchant 130.

Portable consumer device 112 refers to any suitable device that allows the payment transaction to be conducted with merchant 130. Portable consumer device 112 may be in any suitable form. For example, suitable portable consumer devices 112 can be hand-held and compact so that they can fit into a consumer's wallet and/or pocket (e.g., pocket-sized). They may include smart cards, magnetic stripe cards, keychain devices. Other examples of portable consumer devices 112 include cellular phones, personal digital assistants (PDAs), pagers, payment cards, security cards, access cards, smart media, transponders, and the like. In some cases, portable consumer device 112 may be associated with an account of user 110 such as a bank account.

A mobile device 120, discussed in more detail in the context of various embodiments below may be in any suitable form. For example, suitable mobile device can be hand-held and compact so that they can fit into a consumer's wallet and/or pocket (e.g., pocket-sized). Some examples of mobile device include desktop or laptop computers, cellular phones, personal digital assistants (PDAs), pagers, payment cards, security cards, access cards, smart media, transponders, and the like. In some embodiments, portable consumer device 112 may be embodied as a mobile device or considered as a mobile device and a portable consumer device that are embodied in the same device. In alternative embodiments, a user communication device that may be a laptop or desktop computer may replace mobile device 120. In alternative embodiments, mobile device may be replaced with any electronic device or communication device such as a desktop computer with Internet access or network connectivity. Mobile device 120 may communicate with computers such as merchant computer 130, issuer computer 160, or IP Gateway 170 via any acceptable communication medium and protocol, such as mobile phone standard such as 3GPP, a wireless network 802.11 connection via gateway connection to the internet, a wired connection to an additional computer or computing device, or via any other method or system.

Merchant computer 130 refers to a computer for any suitable entity or entities that make a payment transaction with user 110. Merchant 130 may use any suitable method to make the payment transaction. For example, merchant 130 may use an e-commerce business to allow the payment transaction to be conducted by merchant 130 and user 110 through the Internet. Alternatively, merchant 130 may comprise a point of sale (POS) device that is specifically designed to accept data from portable consumer devices such as portable consumer device 112, and to communicate with acquirer 140 as part of a transaction authorization. Other examples of merchant 130 include a department store, a gas station, a drug store, a grocery store, or other suitable business.

In various alternative embodiments, a mobile device, a merchant computer, or any other acceptable alternative may function as an access device that provides an interface for a user to initiate a transaction with a merchant. Another example of an access device is a point of sale terminal discussed further below. One suitable example of an access device is a point of sale terminal that includes a card reader or portable consumer device reader. The card readers may include any suitable contact or contactless mode of operation. For example, exemplary card readers can include RF (radio frequency) antennas, magnetic stripe readers, etc. to interact with the portable consumer devices.

Acquirer computer 140 refers to any suitable entity that has an account with merchant 130. In some embodiments, issuer 160 may also be the acquirer 140.

Payment processing network (PPN) 150 refers to a network of suitable entities that have information related to an account associated with portable consumer device 112. This information includes data associated with the account on portable consumer device 112 such as profile information, data, and other suitable information.

Transaction information or transaction data includes any details from a financial transaction, such as payment amount, user account information, payment time information, and similar such information. Transaction data may include merchant identifier or MCC data as discussed in more detail further below. Additional examples of transaction information are discussed in various embodiments of the innovations discussed herein. he transaction data may include information corresponding to user's purchases, such as a description code (e.g., NAICS: North American Industry Classification System) associated with purchased items, cost of purchased items, and transactions. The transaction data may further include, but not limited to, a description of the purchased items, the payment accounts used, an indication of whether the purchase was made online, a confirmation number, a shipment status (e.g., order being processed, shipped, delivered, on back order, etc.), a delivery tracking number, a cancellation notice, updates, and/or the like. Still further, the transaction data may include information regarding one or more of the user's communication devices such as, but not limited to, the device name (e.g., Apple iPhone™, Motorola Droid™, etc.), means of communication adopted by each device (e.g., SMS message, Email, etc.), and a user-determinable device preference (e.g., Apple iPhone™ device) for establishing communications.

As described herein electronic data and information may be associated with a transaction by being created as part of an electronic process of the transaction. For example, in a computer process that creates and transmits a signal, the signal is associated both with the device that created the signal and the process that created the signal. Further, data or electronic signals or storage records may further be associated with other signals or computer readable data in a recording medium or database by addition of association data to a database record. In one potential example, a first set of data may be analyzed with a text parser to identify the characters of the first set of data, a second set of data may be analyzed with a text parser to identify the characters of the second set of data, and a comparison process or processor may electronically compare the characters of the data. If the characters are similar, or meet association rules of the process, then information may be appended to either set of data indicating the results of the comparison.

Payment processing network 150 may have or operate a server computer and may include a database. The database may include any hardware, software, firmware, or combination of the preceding for storing and facilitating retrieval of information. Also, the database may use any of a variety of data structures, arrangements, and compilations to store and facilitate retrieval of information. The server computer may be coupled to the database and may include any hardware, software, other logic, or combination of the preceding for servicing the requests from one or more client computers. Server computer may comprises one or more computational apparatuses and may use any of a variety of computing structures, arrangements, and compilations for servicing the requests from one or more client computers. In one potential embodiment, server computer may be described by the computing device of FIG. 7. In another potential embodiment, a server computer for use with the present innovations may comprise only a portion of the elements of FIG. 7.

Payment processing network 150 may include data processing subsystems, networks, and operations used to support and deliver authorization services, exception file services, and clearing and settlement services. An exemplary payment processing network 150 may include VisaNet™. Networks that include VisaNet™ are able to process credit card transactions, debit card transactions, and other types of commercial transactions. VisaNet™, in particular, includes a integrated payments system (Integrated Payments system) which processes authorization requests and a Base II system which performs clearing and settlement services. Payment processing network 150 may use any suitable wired or wireless network, including the Internet.

An IP Gateway refers to an entity that includes one or more servers and databases, and have access to various issuer data, transaction data and user data used to generate and deliver notifications and alert messages to various delivery channels. An IP Gateway may be part of the payment processing network 150 or may be a separate entity in communication with payment processing network 150.

Issuer computer 160 refers to any computing device suitable entity that may open and maintain an account associated with portable consumer device 112 for user 110. Some examples of issuers may be a bank, a business entity such as a retail store, or a governmental entity. In many cases, issuer 160 may also issue portable consumer device 112 associated with the account to user 110.

In a typical payment transaction process, user 110 purchases goods or services by presenting his portable consumer device 112 to the merchant computer 130, merchant computer 130 generates an authorization request that includes, among other data, the data received from the portable consumer device 112. Merchant 130 sends the authorization request to the acquirer 140. Acquirer 140 sends the authorization request to the payment processing network 150 which passes the authorization request to the issuer 160. Issuer 160 generates an authorization response that indicates whether the transaction is approved or declined. The authorization response is sent to the payment processing network 150.

In certain embodiments, an authorization request is a signal communicated through a payment system that may include any of the computers or elements described herein for the purpose of authorizing a payment with an issuer. Each authorization request message may include one or more of the following: the transaction amount, a merchant category code, a merchant identifier (such as a merchant verification value or card acceptor value), a recurring payment indicator (which distinguishes recurring payment transactions from non-recurring payment transactions), and the account number (which may include a BIN or bank identification number, a check digit, and other information), the expiration date, and a verification value associated with the old portable consumer device. An initial authorization request is the request for issuer approval of a payment that originates from a user, typically at the physical location of the user. A transaction override authorization request is an authorization request initiated by an override or interrupt system as described in more detail below. In one example, after an initial authorization request is denied, an override system may create a transaction override authorization request for the same transaction before any response is sent to the initial authorization request. In other words, a transaction override authorization request is an authorization request made during a transaction override. In some embodiments, a single transaction initiated by an initial authorization request may include multiple transaction override authorization requests.

The authorization request may include additional transaction data or transaction information. The transaction data may include information corresponding to user's purchases, such as a description code (e.g., NAICS: North American Industry Classification System) associated with purchased items, cost of purchased items, and transactions. The transaction data may further include, but not limited to, a description of the purchased items, the payment accounts used, an indication of whether the purchase was made online, a confirmation number, a shipment status (e.g., order being processed, shipped, delivered, on back order, etc.), a delivery tracking number, a cancellation notice, updates, and/or the like. Still further, the transaction data may include information regarding one or more of the user's communication devices such as, but not limited to, the device name (e.g., Apple iPhone™, Motorola Droid™, etc.), means of communication adopted by each device (e.g., SMS message, Email, etc.), and a user-determinable device preference (e.g., Apple iPhone™ device) for establishing communications.

Additionally, certain registration process may include registration information according to various embodiments of the present innovations. Registration data may include any account or transaction data detailed above, especially in circumstances where registration is being performed in association with or just prior to a transaction. The registration data may further include any suitable information including any suitable combination of the following: a PAN (Primary Account Number) associated with a portable consumer device (e.g., payment card), a ZIP code, a mobile device identifier (e.g., mobile phone number or phone number alias), an electronic serial number (ESN), an International Mobile Equipment Identity (IMEI), a digital certificate, an application identifier, and merchant website account information (e.g., username, password, security questions).

Figure 1B:
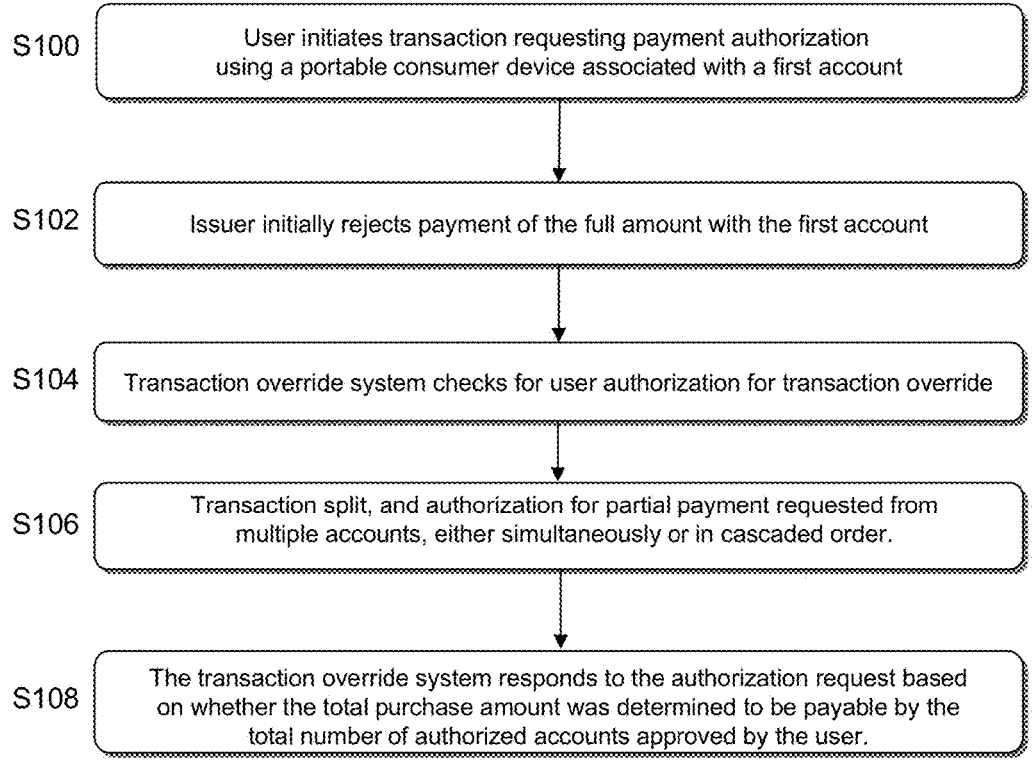
FIG. 1B illustrates a transaction method that operates according to an embodiment of the innovations herein.

FIG. 1B illustrates a method for performing a payment transaction including a transaction override with cascaded transactions, where secondary accounts may be queried for partial payment when an initial payment account is unable to tender a full payment amount. According to the embodiment of FIG. 1B, a user 110 initiates payment in step S100 using portable consumer device 112 with merchant computer 130. In step S102 an issuer performs an authorization check for the payment and initially rejects the request if the primary account associated with portable consumer device 112 is unable to pay the entire amount. In step S104, prior to a rejection being returned in response to the payment authorization request, the issuer computer 160 or payment processing network 150 checks for an override authorization or to see if the user 110 is registered for transaction override system 170. If transaction splitting is preauthorized, the payment is split and the partial payments authorized from multiple accounts in step S106. In certain embodiments, the primary account may be authorized for a portion of the amount, that portion may be cued to be charged to the primary account, and a secondary account queried for the balance. If the secondary account is only able to fund a portion of the remaining balance, the secondary account may be cued for a second amount, and a third card queried for the remaining balance. The requests are cascaded until no more accounts are waiting to be queried, or the total amount is determined to be payable in step S108. A response to the authorization request is then provided through the payment system as part of step S108. In certain embodiments, direct user approval may be required through a mobile device 120 or other computing device for each step. In alternative embodiments, a transaction override system 155 includes an approval from the user that does not require a communication with the user, and each step may occur automatically. For automatic steps, a user may request messages indicating approval and account charge information via a messaging system such as IP gateway 152.

In various implementations, transaction override system 155 may be implemented entirely in payment process network 150 or may be implemented entirely as part of a stand alone system as shown by transaction override system 155, or may be structured as a distributed system that operates both inside and outside the payment processing network. Further alternative embodiments may have transaction override system disposed partly or entirely within one or more issuer computers such as issuer computer 160a.

Figure 1C:
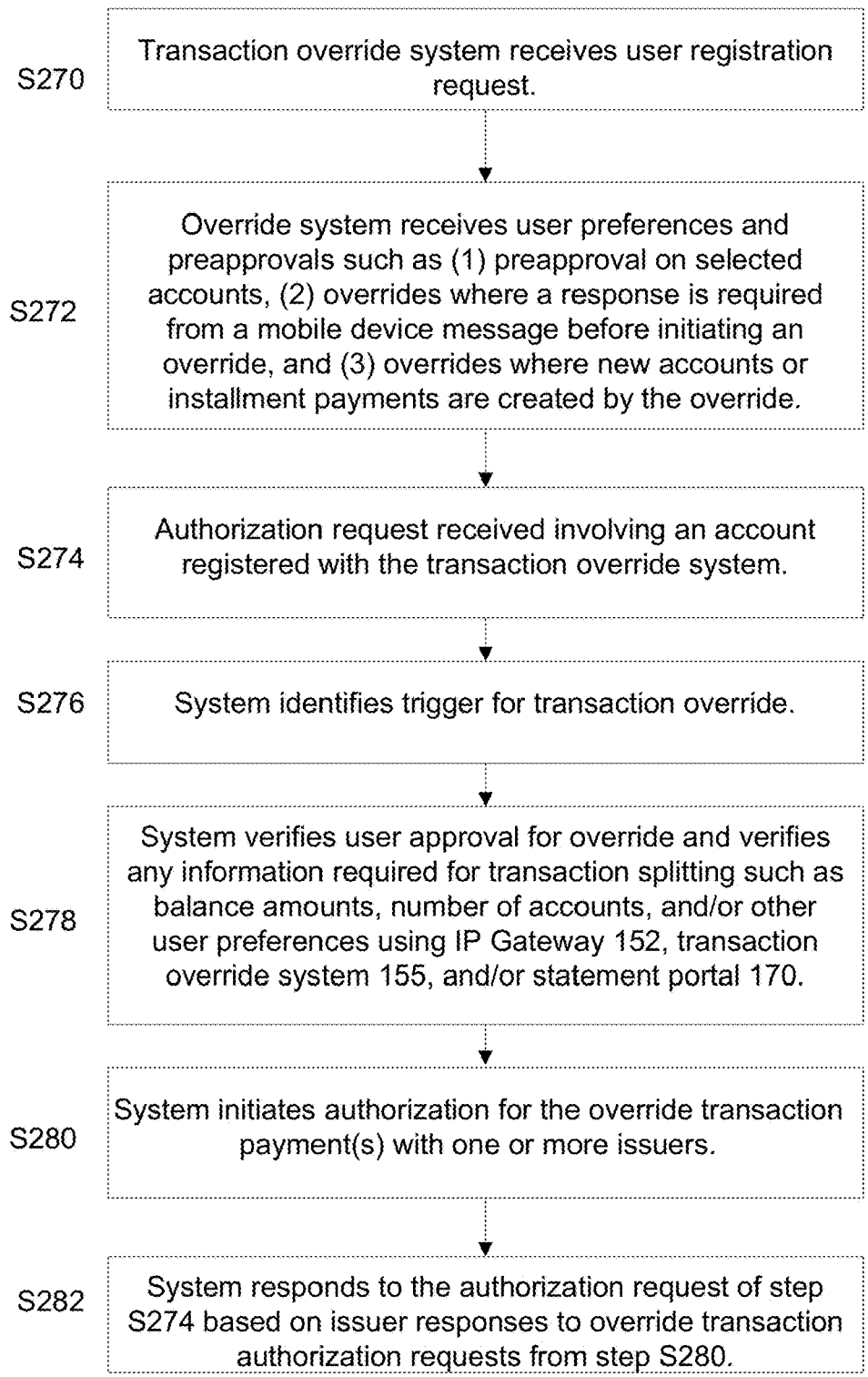
FIG. 1C illustrates a transaction method that operates according to an embodiment of the innovations herein.

FIG. 1C describes one additional potential method of implementing transaction overrides in conjunction with the system of FIG. 1A. In step S170, the transaction override system 155 receives a user registration request. The registration request may be received via a network connection with a computing device or mobile device 120 associated with a user, or via any other electronic registration. After the registration request is received by the transaction override system 155, in step S272, the override system receives user preferences and preapprovals. Examples include a preapproval on selected accounts where a transaction override is always automatically approved if the initial authorization request is rejected. Another example includes override preferences where the user requests a message transaction as part of the override approval, and a response is required from a mobile device before an override is approved. Additional preferences may allow for overrides where new accounts or installment payments are created at the time of override approval. Additional details with respect to various override preferences will be discussed below. In step S274, an authorization request is received for an account registered with the transaction override system. In step S276, the system identifies a trigger for transaction override. Such an identification may occur in the payment processing network 150, at an issuer computer 160, by transaction override system 155 receiving a message from another part of the system, or by any combination of these devices working in conjunction. In step S278, the system verifies user approval for the override and verifies any information required for transaction splitting such as balance amounts, number of accounts, and/or other user preferences using IP Gateway 152 and transaction override system 155.

Then if user messaging approval is required by the user preferences, the transaction override system may verify user approval using a communication via IP gateway 152, an internet network connection or connection such as network 114, or via any other electronic communication path. For IP gateway 152 communications, such communication may occur via SMS, e-mail or smart-phone applications. Systems and methods for generating and delivering messages are described in detail in the U.S. patent application Ser. No. 12/563,586, entitled "Intelligent Alert System and Method," filed Sep. 21, 2009, which is hereby incorporated by reference.

In step S280, the system initiates authorization for the override transaction payment(s) with one or more issuers. This authorization may include multiple authorization steps where multiple accounts are authorized by one or more issuers. The approval or disapproval of any individual override transaction is not definitive for the final response to the initial authorization request. If multiple override transactions can meet the total amount requested by the initial authorization request, an approval may be sent in response to the initial authorization request even if one or more of the override transaction authorizations are rejected by the associated issuers. Finally, in step S282, the system responds to the authorization request of step S274 based on issuer responses to override transaction authorization requests from step S170. If any combination of approved override transaction payments is able to meet the total value of the initial authorization payment request, the system may respond to the initial request with an approval.

Figure 1D:
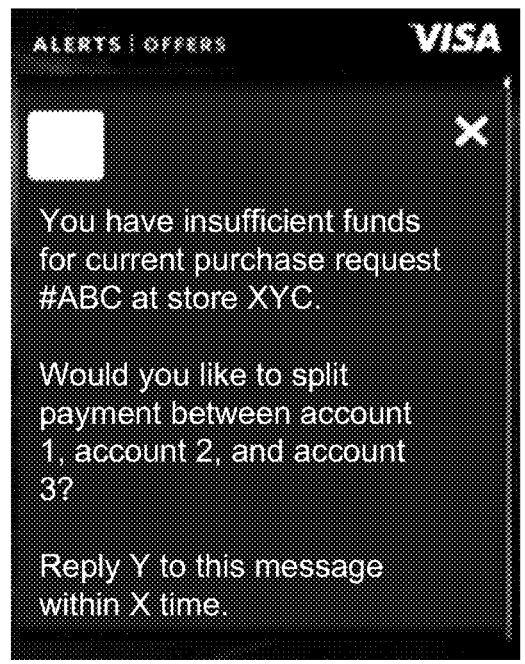
FIG. 1D illustrates an example of an interface, according to an embodiment of the innovations herein.

FIG. 1D describes one potential embodiment of a messaging interface that may be communicated from transaction override system 155b to mobile device 120 as part of a user authorization for a transaction override. The interface of FIG. 1D may be communicated from transaction override system 155 via network 114. Alternatively, the interface may be stored on the user device, and the message content may be communicated to the user device via the payment processing network.

Figure 2:
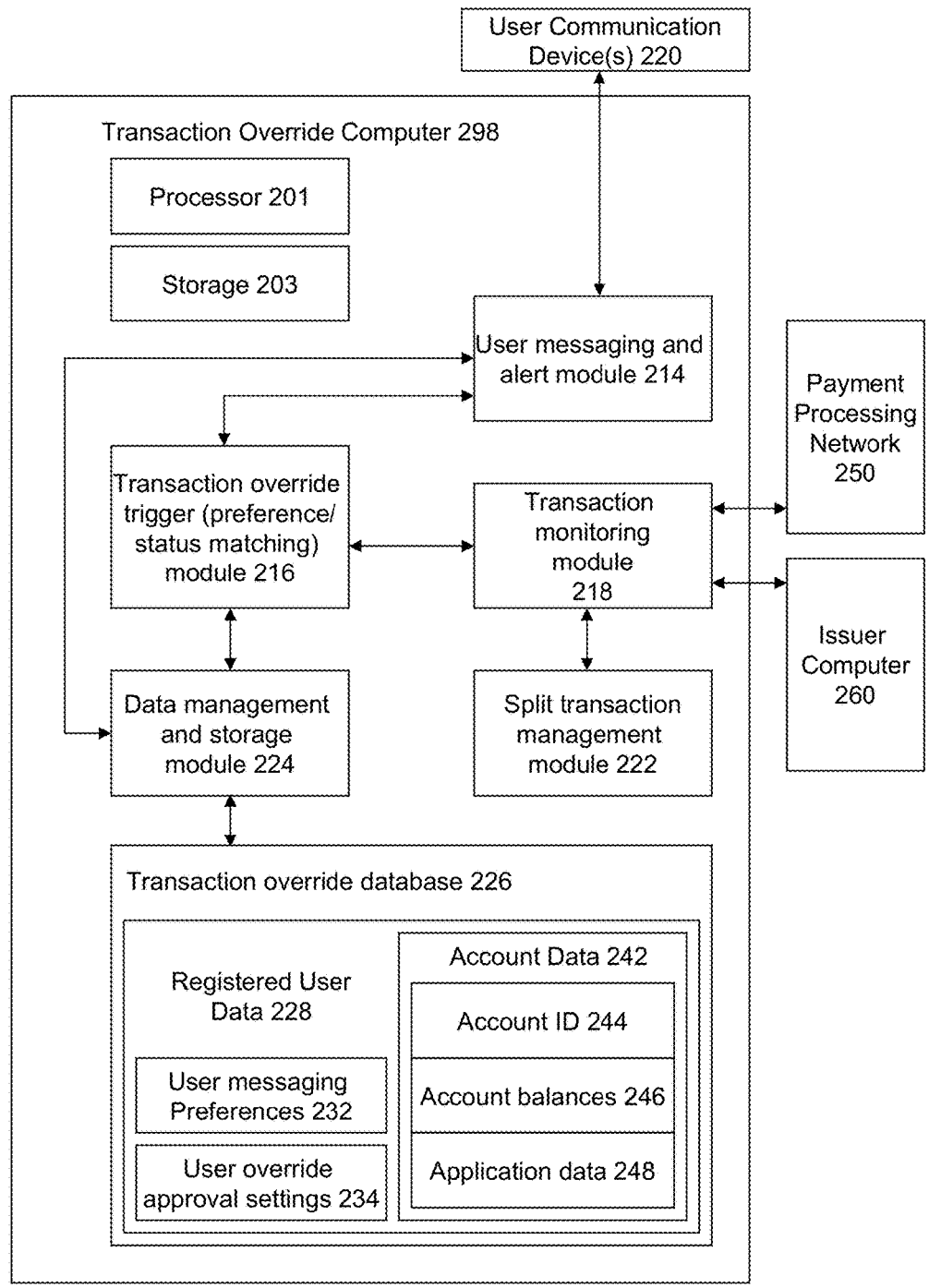
FIG. 2 shows a system, according to one potential embodiment of the innovations herein.

FIG. 2 describes a detailed embodiment of one potential implementation of a transaction override system. The system of FIG. 2 includes user communication device(s) 220, payment processing network 250, and issuer computer 260. As discussed above, a transaction override computer such as transaction override computer 298 of FIG. 2 may be incorporated fully or partially with either a payment processing network or an issuer computer.

The transaction override computer 298 of FIG. 2 includes a processor 201 and a computer readable storage medium 203. The various modules and database storage may be implemented in various possible combinations using processor 201, storage medium 203, and any other network or computing element that may implement the described systems and methods.

Transaction override computer 298 further comprises transaction monitoring module 218, transaction override trigger 216, split transaction management module 222, data management and storage module 224, user messaging and alerts module 214, and transaction override database 226.

FIG. 2 includes transaction data monitoring module 218 for monitoring data. During operation of a payment processing network such as VisaNet™, the payment processing network may process a large volume of transactions that may process many thousands of transactions in fractions of a second. In certain embodiments, transaction data receiving module may communicate with payment processing network 250 to identify a subset of the transactions processed by payment processing network 250 that may be associated with a user registered with a transaction override computer 298. The subset of transactions that are registered with transaction override computer may identified and routed by the payment processing network 250. In such a system, transaction override computer 298 may communicate a list of identifying information to payment processing network 250 so that transaction information can be routed to transaction monitoring module 218. Similarly, in certain embodiments issuer computer 260 may route appropriate transaction data to transaction monitoring module 218. Alternatively the transaction monitoring module 218 may have access to all transaction data passing through payment processing network 250, and may select data associated with registered statement portal users while discarding or deleting data not associated with statement portal users.

Additionally, for a transaction interrupt to be successful, the transaction override computer must interrupt a standard message flow providing an approval or rejection response that flows from an issuer to a payment processing network back to a merchant computer. Transaction monitoring module may further communicate with either issuer computer 260 or payment processing network 250 to interrupt and control the response flow and timing in conjunction with split transaction management module 222. In a standard authorization process, a limited amount of time is allowed for an authorization response or denial. When a transaction override system identifies a potential override, the management of signal flow and response timing may be passed off to split transaction management module 222. Split transaction management module 222 may identify a time limit for overall approval when split or override transaction approvals are communicated to one or more issuers. If an excessive amount of time is taken for the override transaction, split transaction management module 222 may abort the override and transfer management of the authorization response back to the system that had transferred control to module 222.

Transaction override computer 298 may include transaction override database 226. In certain embodiments, transaction override database 226 may include registered user data 228 for use with override operations. Registered user data 228 may include user messaging preferences 232 that indicate when a user may wish to approve an override using user communication device 222. Registered user data 228 may further include user override approval settings 234 that may directly provide override approval without user interaction. Finally, data 228 may include account data 242 that stores account IDs 244 that may be used for authenticating override approval transaction amounts. Further, account data 242 may store account balances 246 or application data 248 to assist with pre-approval of override authorization requests, or the help split transaction management module 222 to identify overrides that have an especially high or low probability of success. This may allow split transaction management module 222 to complete an override process in a shorter amount of time.

Transaction override trigger module 216 may function to receive transaction information from transaction monitoring module 218 and identify if the conditions are present for a transaction override. In one potential embodiment, transaction override trigger module 216 functions as a matching or comparison module between one or more user preferences stored in transaction override database 226 and data received from transaction monitoring module 218. For example, a user override approval setting may indicate that all transactions over $2000 for a certain account are approved for a transaction override. Transaction override trigger may receive transaction data for the identified account that has an authorization amount of $3000 and store the account ID and authorization request amount. Transaction override trigger module may then retrieve user override approval settings 234 from database 226. When the approval settings are received, the transaction override trigger compares the $2000 override approval setting/trigger to the $3000 transaction request and identifies that the override is both triggered and approved. The user preference/override approval settings 234 are thus compared to the actual transaction status/information. Comparison of the values may be performed by a text parsing module and a comparison module operating within transaction override trigger module and functioning by operation of the computing processor of the computer or server.

In another embodiment, the user override approval settings may request a message when the trigger occurs. In such an embodiment, after transaction override trigger module compares the $2000 preference with the $3000 status, a message is communicated to user communication device 220 via user messaging and alert module 214. If the user does not respond within a given time or denies the override request, the transaction override does not occur. In various embodiments, while the transaction override computer 298 is waiting for override approval, split transaction management module 222 may manage the transaction. Alternatively, transaction override computer 298 may request that the system managing the transaction institute a delay while an override approval is processed.

User messaging and alert module 214 therefore not only manages override approvals from a user communication device, but also receives registration and user preference information. In certain embodiments, user messaging and alert module 214 receives registration, account, and other data from user communication device 220. In alternative embodiments, an issuer may automatically register a user for a transaction override system, and the initial user messaging preferences 232, user override approval settings 234, and account data 242 may be received directly from an issuer computer.

In an additional alternative embodiment, a transaction override computer 298 receives the initial registered user data 228 from a user communication device, but receives updates from an issuer computer 260. For example, in certain embodiments transaction override database 226 may communicate with issuer computer 260 to provide account balances 246 and an associated pre-approval for a transaction override authorization. In such an embodiment, when a transaction override is triggered and approved, an initial authorization request may be responded to by the override system based on pre-approval information stored in database 226. In such embodiments, pre-approval data may be refreshed on a daily basis, and the pre-approval may expire at the end of a given time period. Similarly, application data 248 may include both an application for a new account with an issuer, and a pre-approval for the account opening that may allow the transaction override computer 298 to override a transaction and respond to the authorization request based on the new account pre-approval. In the absence of pre-approval or the expiration of pre-approval, the override system may communicate the new account request or override authorization request to the issuer, and then respond to the initial authorization request based on the response from the issuer to the override authorization request.

Database 226 additionally stores account ID information 244. As previously discussed, a transaction override may attempt to respond to an initial authorization request based on multiple alternative accounts. In one potential embodiment, a user has three account IDs 244 stored as part of account data 242. In one particular example, transaction monitoring module 218 receives the transaction information, the transaction override is triggered and approved for all three account IDs, and split transaction management module accepts management control of the original authorization request. For a case where there is not pre-approval authorized amount at the transaction override computer 298, split transaction management module 222 controls not only the original authorization request, but up to three different override authorization requests. For a cascading override, the management module 222 may send a first override authorization request for the first account from account ID. When a response is received for the first account ID 244, a second override authorization request may be communicated from split transaction management module 222 to an associated issuer. Finally, after the second override authorization response is received at split transaction management module 222, the third and final override authorization request may be transmitted. At anytime during the cascaded override authorization, split transaction management module may observe account data indicating account balances and account limits, and determine that there is no potential for the cascaded override authorization to successfully authorize a complete amount of the original authorization request. The split transaction management module may then interrupt the cascaded override authorization and either respond to the initial authorization request with a denial or transfer control of the original authorization request to another party.

Figure 3A:
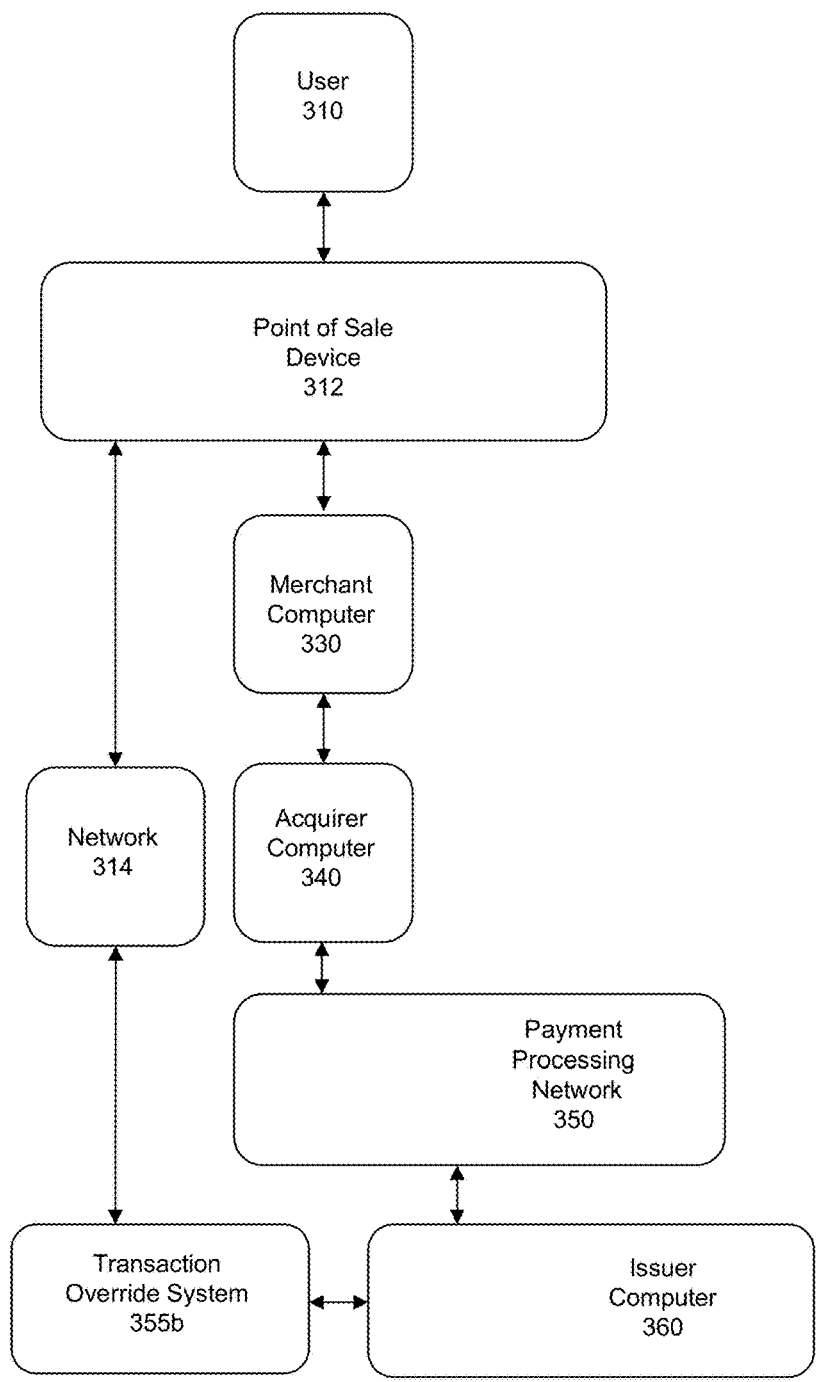
FIG. 3A shows a system, according to one potential embodiment of the innovations herein.

FIG. 3A describes one additional alternative embodiment of a system for transaction overrides. the system of FIG. 3A includes user 310, point of sale device 312, merchant computer 330, acquirer computer 340, payment processing network 350, issuer computer 360, and transaction override system 355*a* and 355*b*. Many of the elements described in FIG. 3A may function in a manner described above for similar or comparable elements.

Point of sale device 312 may be a computing device with an interface for a portable consumer device of user 310 for initiating payments to a merchant. In certain embodiments, point of sale device 312 and merchant computer 330 may be embodiment as part of the same device. In various embodiments for use with a transaction override system, point of sale device 312 may include a touch screen interface, and messaging functionality for communicating both with the payment processing network 350 via a first channel of communication and with a transaction override system 355 via a second channel of communication. FIG. 3C illustrates one potential messaging interface for a point of sale device 312 that is interacting with a transaction override system 355.

Figure 3B:
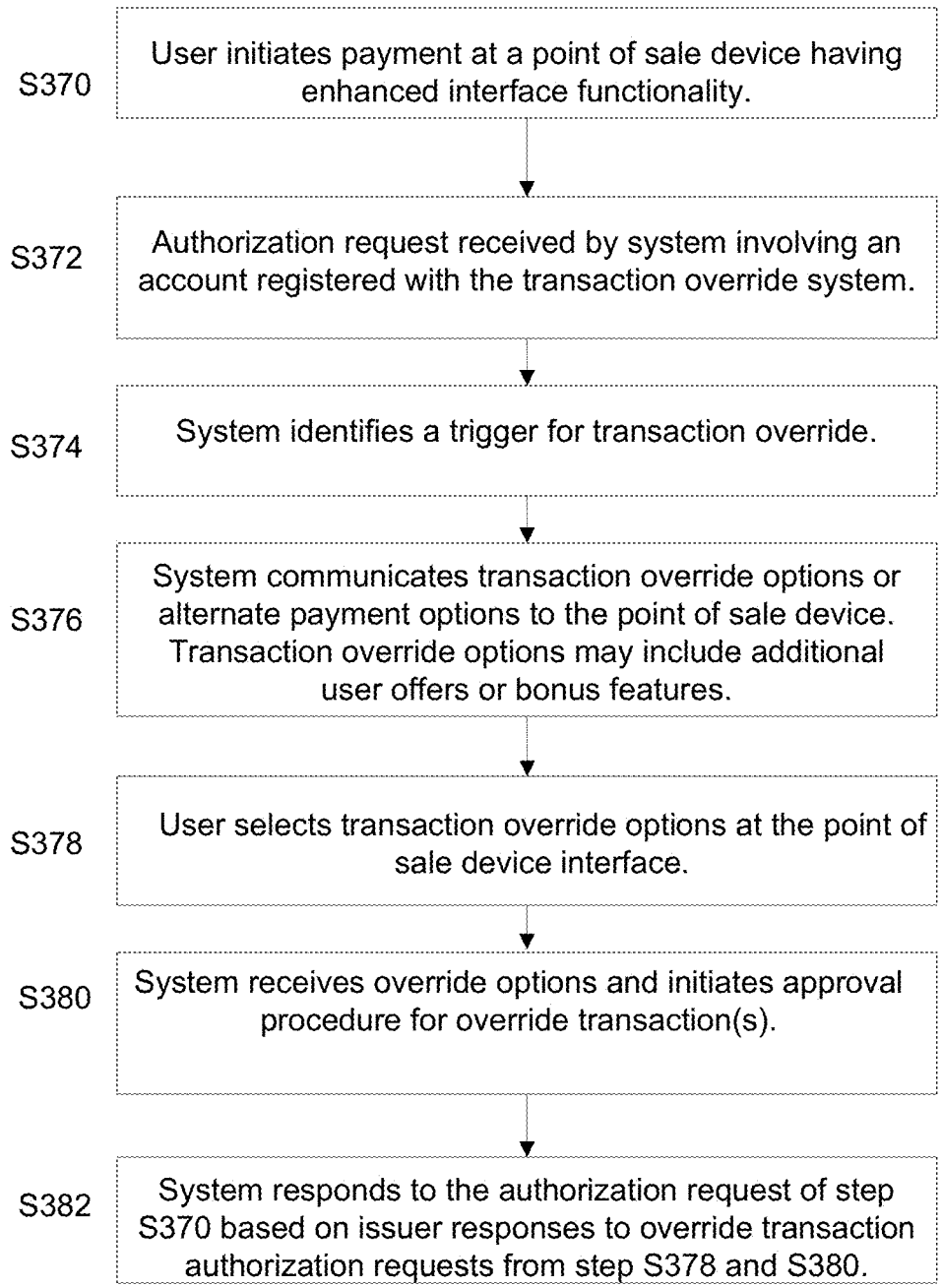
FIG. 3B illustrates a transaction method that operates according to an embodiment of the innovations herein.

FIG. 3B describes one potential method of implementing transaction overrides in conjunction with the system of FIG. 3A. In step S370, a user initiates payment at a point of sale device having enhanced interface functionality. In step S372, an authorization request received by system involving an account registered with the transaction override system. In step S374, the system identifies a trigger for transaction override. In step S376, the system communicates transaction override options or alternate payment options to the point of sale device. Transaction override options may include additional user offers or bonus features. In step S378, user 310 selects a transaction override options at the point of sale device interface. In step S380, the system receives override options and initiates approval procedure for override transaction(s). In step S382, the system responds to the authorization request of step S370 based on issuer responses to override transaction authorization requests from step S378 and S380.

Figure 4:
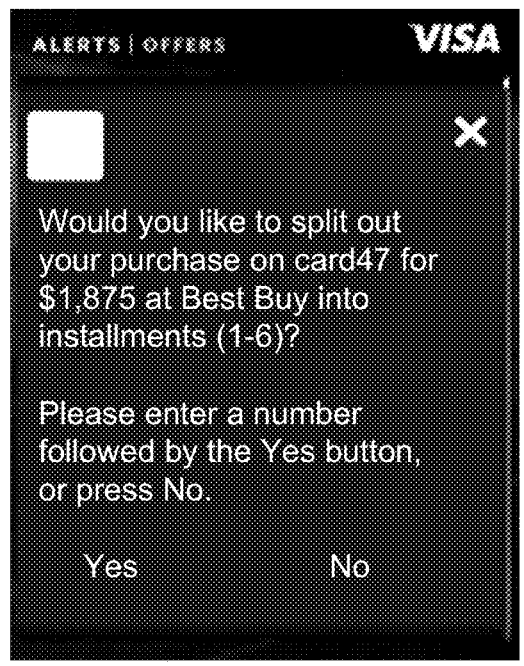
FIG. 4 illustrates an example of an interface, according to an embodiment of the innovations herein.

FIG. 4 includes one potential example of a user interface that may be used in conjunction with various embodiments of the present innovations. For example, according to the method of FIG. 3B, an interface such as the interface shown in FIG. 4 may be presented to a user at point of sale device 312. Alternatively, an interface such as the interface shown in FIG. 4 may be presented to a user via a mobile device 120 in a system according to the embodiments shown in FIG. 1A.

Thus, in accordance with various embodiments described above, the present innovations may include a method comprising: monitoring at a transaction override computer, a first authorization request associated with a first account; comparing, using a processor of the transaction override computer, a user override preference with the first authorization request to identify an override trigger; receiving a transaction override approval; transmitting a transaction override authorization in response to the transaction override approval; receiving a response to the transaction override authorization request; and transmitting a response to the first authorization request based on the response to the transaction override authorization request The present innovations may further include a method comprising: monitoring at an issuer computer, a first authorization request associated with a first account; comparing, using a processor of the issuer computer, a user override preference with the first authorization request to identify an override trigger; receiving a transaction override approval; transmitting a transaction override authorization in response to the transaction override approval; receiving a response to the transaction override authorization request; and transmitting a response to the first authorization request based on the response to the transaction override authorization request. In certain embodiments, transmitting a transaction override authorization may comprise communicating a query to an authorization database within an issuer computer.

The present innovations may further include a method comprising: monitoring at a payment processing network, a first authorization request associated with a first account; comparing, using a processor of the payment processing network, a user override preference with the first authorization request to identify an override trigger; receiving a transaction override approval; transmitting a transaction override authorization request in response to the transaction override approval; receiving a response to the transaction override authorization request; and transmitting a response to the first authorization request based on the response to the transaction override authorization request.

Figure 5A:
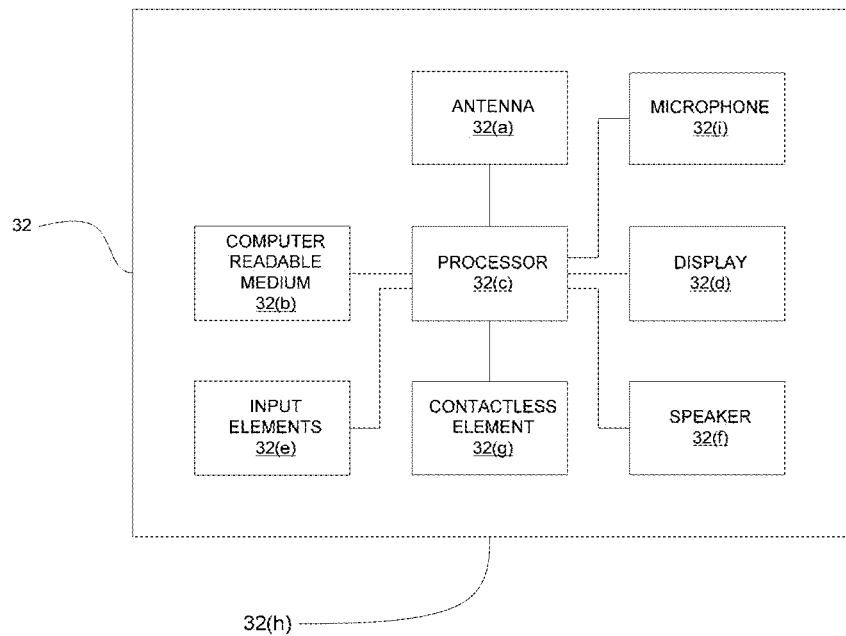
FIG. 5A illustrates one potential embodiment of a computing device or system that may make up elements of or be used with various embodiments of the innovations presented herein.

FIG. 5(a) shows a block diagram of one potential example of a mobile phone in phone 32 that can be used in embodiments of the invention. The non-limiting example presented by phone 32 may comprise a computer readable medium and a body as shown in FIG. 5(a). The computer readable medium 32(b) may be present within the body 32(h), or may be detachable from it. The body 32(h) may be in the form a plastic substrate, housing, or other structure. The computer readable medium 32(b) may be in the form of (or may be included in) a memory that stores data (e.g., issuer account numbers, loyalty provider account numbers, and other elements of split payment data) and may be in any suitable form including a magnetic stripe, a memory chip, etc. The memory preferably stores information such as financial information, transit information (e.g., as in a subway or train pass), access information (e.g., as in access badges), etc. Financial information may include information such as bank account information, loyalty account information (e.g., a loyalty account number), a bank identification number (BIN), credit or debit card number information, account balance information, expiration date, consumer information such as name, date of birth, etc. Any of this information may be transmitted by the phone 32.

The phone 32 may further include a contactless element 32(g), which is typically implemented in the form of a semiconductor chip (or other data storage element) with an associated wireless transfer (e.g., data transmission) element, such as an antenna. Contactless element 32(g) is associated with (e.g., embedded within) phone 32 and data or control instructions transmitted via a cellular network may be applied to contactless element 32(g) by means of a contactless element interface (not shown). The contactless element interface functions to permit the exchange of data and/or control instructions between the mobile device circuitry (and hence the cellular network) and an optional contactless element 32(g).

Contactless element 32(g) is capable of transferring and receiving data using a near field communications ("NFC") capability (or near field communications medium) typically in accordance with a standardized protocol or data transfer mechanism (e.g., ISO 14443/NFC). Near field communications capability is a short-range communications capability, such as RFID, Bluetooth™, infra-red, or other data transfer capability that can be used to exchange data between the phone 32 and an interrogation device. Thus, the phone 32 is capable of communicating and transferring data and/or control instructions via both cellular network and near field communications capability.

The phone 32 may also include a processor 32(c) (e.g., a microprocessor) for processing the functions of the phone 32 and a display 32(d) to allow a consumer to see phone numbers and other information and messages. The phone 32 may further include input elements 32(e) to allow a consumer to input information into the device, a speaker 32(f) to allow the consumer to hear voice communication, music, etc., and a microphone 32(i) to allow the consumer to transmit her voice through the phone 32. The phone 32 may also include an antenna 32(a) for wireless data transfer (e.g., data transmission).

In some embodiments, information in the memory may also be in the form of data tracks that are traditionally associated with credits cards. Such tracks include Track 1 and Track 2. Track 1 ("International Air Transport Association") stores more information than Track 2, and contains the cardholder's name as well as account number and other discretionary data. Track 2 ("American Banking Association") is currently most commonly used. This is the track that is read by ATMs and credit card checkers. The ABA (American Banking Association) designed the specifications of this track and all world banks must abide by it. It contains the cardholder's account, encrypted PIN, plus other discretionary data.

Figure 5B:
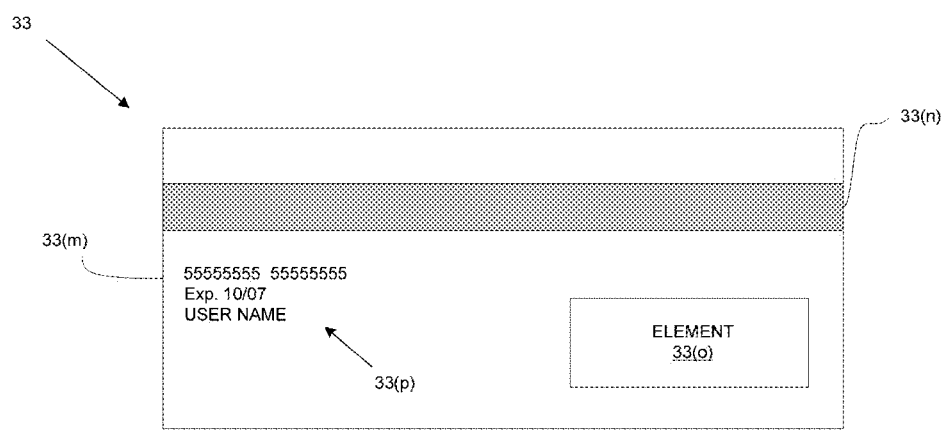
FIG. 5B illustrates one potential embodiment of a portable consumer device that may be used with various embodiments of the innovations presented herein.

FIG. 5B shows an embodiment of a portable consumer device. Portable consumer device 33 may include a magnetic stripe 33(n) that has a recording of track data as described above. Portable consumer device 33 further may include customer information 33(m) including account information for an account or a primary account associated with the device and the data stored by the device. Portable consumer device 33 may additional include a contactless element 33(o) that stores track data in an element capable of communicating with a point of sale or other access device wirelessly.

Figure 6:
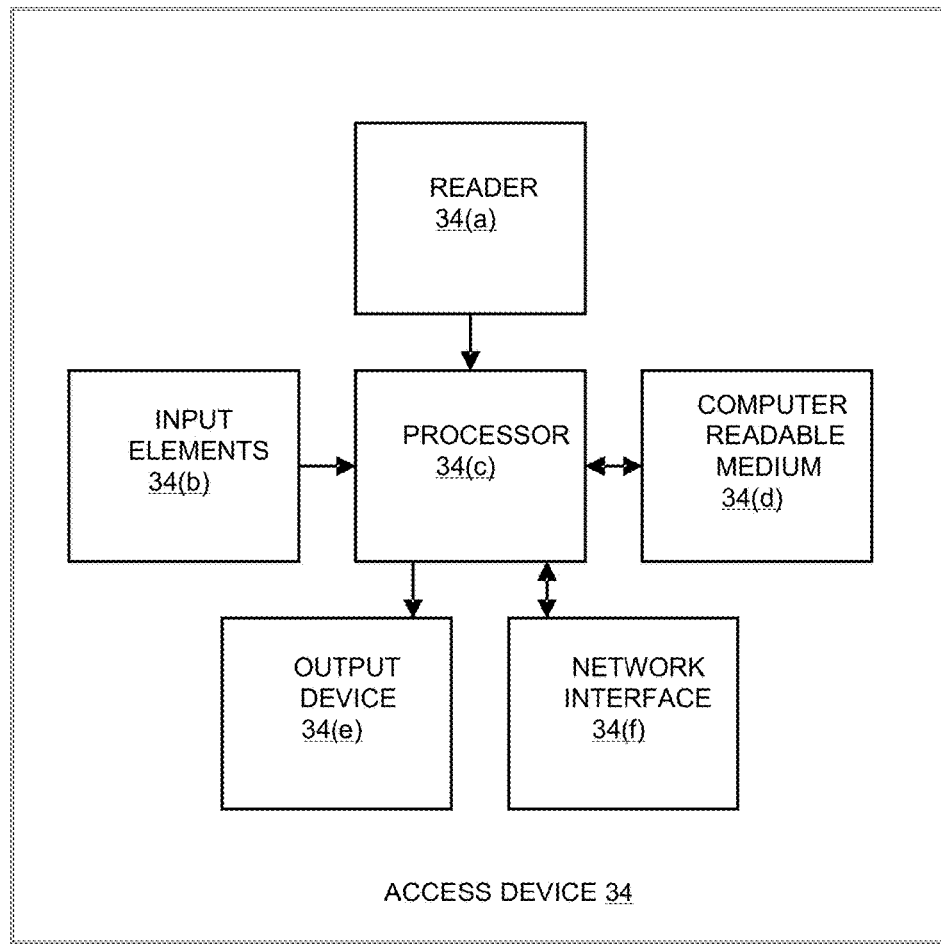
FIG. 6 illustrates one potential embodiment of a computing device or system that may make up elements of or be used with various embodiments of the innovations presented herein.

FIG. 6 shows a block diagram of one potential example of a point of sale or access device that may be used with various embodiments that function according to the innovations presented herein. The access device 34 comprises a processor 34(c) operatively coupled to a computer readable medium 34(d) (e.g., one or more memory chips, etc.), input elements 34(b) such as buttons, a touchscreen display, or a combination of such interfaces, a reader 34(a) (e.g., a contactless reader, a magnetic stripe reader, etc.), an output device 34(e) (e.g., a display, a speaker, etc.) and a network interface 34(f). The computer readable medium may comprise instructions or code, executable by a processor. The instructions may include instructions sending and receiving authorization requests and responses, and for sending and receiving transaction interrupt queries and responses.

Figure 7:
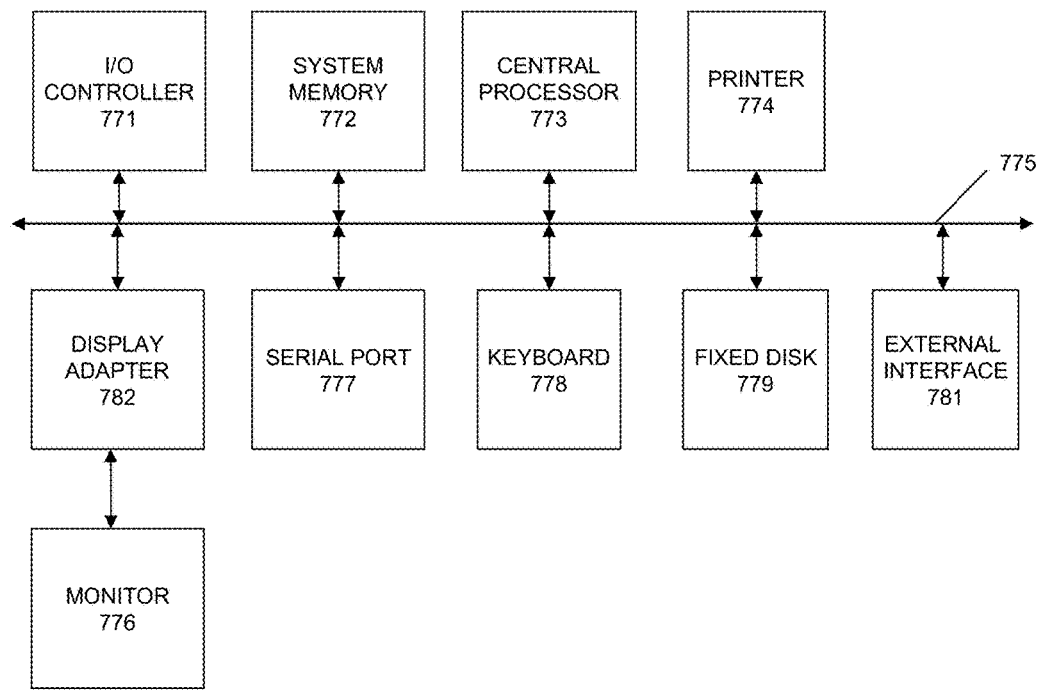
FIG. 7 illustrates one potential embodiment of a computing device or system that may make up elements of or be used with various embodiments of the innovations presented herein.

In addition to the embodiments of various participants and elements of the system shown in FIGS. 4-6, the computer, device, and system elements of FIGS. 1-3 may operate one or more computer apparatuses to facilitate the functions described herein. Any of the elements in the figures may thus use any suitable number of subsystems to facilitate the functions described herein. Examples of one potential embodiment including such subsystems or components are shown in FIG. 7. The subsystems shown in FIG. 7 are interconnected via a system bus 775. Additional subsystems such as a printer 774, keyboard 778, fixed disk 779 (or other memory comprising computer readable media), monitor 776, which is coupled to display adapter 782, and others are shown. Peripherals and input/output (I/O) devices, which couple to I/O controller 771, can be connected to the computer system by any number of means known in the art, such as serial port 777. For example, serial port 777 or external interface 781 can be used to connect the computer apparatus to a wide area network such as the Internet, a mouse input device, or a scanner. The interconnection via system bus allows the central processor 773 to communicate with each subsystem and to control the execution of instructions from system memory 772 or the fixed disk 779, as well as the exchange of information between subsystems. The system memory 772 and/or the fixed disk 779 may embody a computer readable medium.

In certain embodiments, the system can include one or more databases. The location of the database(s) is discretionary: merely by way of example, a database might reside on a storage medium local to (and/or resident in) a server (and/or a user computer). Alternatively, a database can be remote from any or all of the computers so long as the database can be in communication (e.g., via the network) with one computer. In a particular set of embodiments, a database can reside in a storage-area network ("SAN") familiar to those skilled in the art. (Likewise, any necessary files for performing the functions attributed to the computers or servers can be stored locally on the respective computer and/or remotely, as appropriate.) In one set of embodiments, the database can be a relational database, such as an Oracle™ database, that is adapted to store, update, and retrieve data in response to SQL-formatted commands. The database might be controlled and/or maintained by a database server, as described above, for example.

The software components or functions described in this application may be implemented as software code to be executed by one or more processors using any suitable computer language such as, for example, Java, C++ or Perl using, for example, conventional or object-oriented techniques. The software code may be stored as a series of instructions, or commands on a computer-readable medium, such as a random access memory (RAM), a read-only memory (ROM), a magnetic medium such as a hard-drive or a floppy disk, or an optical medium such as a CD-ROM. Any such computer-readable medium may also reside on or within a single computational apparatus, and may be present on or within different computational apparatuses within a system or network.

The present invention can be implemented in the form of control logic in software or hardware or a combination of both. The control logic may be stored in an information storage medium as a plurality of instructions adapted to direct an information processing device to perform a set of steps disclosed in embodiments of the present invention. Based on the disclosure and teachings provided herein, a person of ordinary skill in the art will appreciate other ways and/or methods to implement the present invention.

The uses of individual numerical values are stated as approximations as though the values were preceded by the word "about" or "approximately." Similarly, the numerical values in the various ranges specified in this application, unless expressly indicated otherwise, are stated as approximations as though the minimum and maximum values within the stated ranges were both preceded by the word "about" or "approximately." In this manner, variations above and below the stated ranges can be used to achieve substantially the same results as values within the ranges. As used herein, the terms "about" and "approximately" when referring to a numerical value shall have their plain and ordinary meanings to a person of ordinary skill in the art to which the particular subject matter is most closely related or the art relevant to the range or element at issue. The amount of broadening from the strict numerical boundary depends upon many factors. For example, some of the factors which may be considered include the criticality of the element and/or the effect a given amount of variation will have on the performance of the claimed subject matter, as well as other considerations known to those of skill in the art. As used herein, the use of differing amounts of significant digits for different numerical values is not meant to limit how the use of the words "about" or "approximately" will serve to broaden a particular numerical value. Thus, as a general matter, "about" or "approximately" broaden the numerical value. Also, the disclosure of ranges is intended as a continuous range including every value between the minimum and maximum values plus the broadening of the range afforded by the use of the term "about" or "approximately." Thus, recitation of ranges of values herein are merely intended to serve as a shorthand method of referring individually to each separate value falling within the range, unless otherwise indicated herein, and each separate value is incorporated into the specification as if it there individually recited herein.

It is to be understood that any ranges, ratios and ranges of ratios that can be formed by, or derived from, any of the data disclosed herein represent further implementations of the present disclosure and are included as part of the disclosure as though they were explicitly set forth. This includes ranges that can be formed that do or do not include a finite upper and/or lower boundary. Accordingly, a person of ordinary skill in the art most closely related to a particular range, ratio or range of ratios will appreciate that such values are unambiguously derivable from the data presented herein.

The use of the terms "a" and "an" and "the" and similar referents in the context of this disclosure (especially in the context of the following claims) are to be construed to cover both the singular and the plural, unless otherwise indicated herein or clearly contradicted by context. All methods described herein can be performed in any suitable order unless otherwise indicated herein or otherwise clearly contradicted by context. The use of any and all examples, or exemplary language (e.g., such as, preferred, preferably) provided herein, is intended merely to further illustrate the content of the disclosure and does not pose a limitation on the scope of the claims. No language in the specification should be construed as indicating any non-claimed element as essential to the practice of the claimed invention.

For figures and descriptions describing various embodiments of the innovations presented herein further understanding of the nature and advantages of the present invention herein may be realized by reference to the remaining portions of the specification and the attached drawings. References to "steps" of the present invention or innovations in the figures or detailed description should not be construed as limited to "step plus function" means, and are not intended to refer to a specific order for implementing the invention.

Use of the phrase 'the invention' or 'the present invention' is not meant to limit the claims in any manner and no conclusion should be drawn that any description or argument associated with a particular use of the phrase 'the invention' or 'the present invention' applies to each and every claim. The use of the phrase 'the invention' or 'the present invention' has been used solely for linguistic or grammatical convenience and not to effect a limitation of any nature on any of the claims.

Alternative implementations invention are described herein, including the best mode known to the inventors for carrying out the claimed invention. Of these, variations of the disclosed implementations will become apparent to those of ordinary skill in the art upon reading the foregoing disclosure. The inventors expect skilled artisans to employ such variations as appropriate, and the inventors intend for the claimed invention to be practiced otherwise than as specifically described herein. Accordingly, the claimed invention includes all modifications and equivalents of the subject matter recited in the claims appended hereto as permitted by applicable law. Moreover, any combination of the above-described elements in all possible variations thereof is encompassed by the claimed invention unless otherwise indicated herein or otherwise clearly contradicted by context.

While the present invention may be embodied in many different forms, several specific embodiments are discussed herein with the understanding that the present disclosure is to be considered only as an exemplification of the principles of the invention, and it is not intended to limit the invention to the embodiments illustrated.

What is claimed is:

1. A computer implemented method for payment transaction splitting in an electronic payment network, the method comprising:

receiving, by a transaction monitoring module in a transaction override computer system, an initial payment transaction authorization request associated with a first account of a user via a first communication path, wherein the initial payment transaction authorization request is received from a merchant computer;

interrupting, by the transaction monitoring module, a message denying approval of the initial payment transaction authorization request from an issuer of the first account directed to the merchant computer;

analyzing, by a transaction override trigger module in the transaction override computer system, data stored at a transaction override database for user preferences stored in connection with the first account of the user;

identifying, by the transaction override trigger module, a transaction override trigger among the user preferences associated with the first account of the user after the initial payment transaction authorization request has been denied by the issuer of the first account, the transaction override trigger for splitting a total payment amount of the initial payment transaction authorization request between two or more payment accounts of the user;

sending, by a messaging and alert module in the transaction override computer system, a communication to a portable communication device of the user to verify user approval of payment transaction splitting instead of returning a rejection response to the merchant computer over the first communication path in response to the initial payment transaction authorization request, wherein the communication is sent to the portable communication device of the user via a second communication path that is different from the first communication path;

receiving by the messaging and alert module in the transaction override computer system, an input from the portable communication device of the user indicating a transaction override approval, the transaction override approval obtained from the portable communication device of the user via the second communication path, wherein the transaction override approval indicates approval for payment of a first partial payment amount of the total payment amount using the first account;

in response to receiving the transaction override approval from the portable communication device of the user, splitting, by a split transaction management module in the transaction override computer system, the total payment amount into the first partial payment amount and at least a second partial payment amount;

transmitting, by the split transaction management module, to the issuer of the first account, a request to authorize payment of the first partial payment amount using the first account;

requesting and receiving approval, by the messaging and alert module, for payment of the second partial payment amount of the total payment amount using a second account of the user, wherein the approval for payment of the second partial payment amount is obtained from the portable communication device;

transmitting, by the split transaction management module, a transaction override authorization request to an issuer of the second account of the user registered with the transaction override computer system in response to the approval for payment of the second partial payment amount received via the second communication path, wherein the transaction override authorization request includes a request to authorize payment of the second partial payment amount using the second account;

receiving, by the split transaction management module, a response to the transaction override authorization request from the issuer of the second account; and transmitting, by the split transaction management module to the merchant computer, a response to the initial payment transaction authorization request authorizing or denying the total payment amount based on a response received for the request to authorize payment of the first partial payment amount by the issuer of the first account and the response received for the transaction override authorization request by the issuer of the second account.

2. The method of claim 1 further comprising: identifying a first user account balance of the first account and a second user account balance of the second account from a transaction override database; and comparing a sum of the first user account balance and the second user account balance to the total payment amount of the initial payment transaction authorization request.

3. The method of claim 1 wherein the transaction override approval is requested from the portable communication device by transmitting a request for the transaction override approval via an alert module in response to identifying the transaction override trigger at payment processing network.

4. The method of claim 1 wherein when multiple override transactions meet the total payment amount in the initial payment transaction authorization request, an approval is transmitted in response to the initial payment transaction authorization request even if one or more of the override transactions are rejected by an associated issuer.

5. The method of claim 1 further comprising:
determining, by the transaction override computer system, a probability of success for receiving authorization for the second partial payment amount from an issuer of each of one or more accounts of the user.

6. The method of claim 1 wherein an account balance associated with the first account is insufficient to approve the initial payment transaction authorization request.

7. The method of claim 1 wherein the transaction override trigger is identified in the event that the total payment amount of the initial payment transaction authorization request exceeds a predetermined threshold.

8. A computer implemented method for payment transaction splitting in an electronic payment network, the method comprising:
receiving, by a transaction monitoring module in a transaction override computer system, an initial transaction authorization request associated with a first account of a user via a first communication path, wherein the initial transaction authorization request is received from a merchant computer;
interrupting, by the transaction monitoring module, a message denying approval of the initial transaction authorization request from an issuer of the first account directed to the merchant computer;
analyzing, by a transaction override trigger module in the transaction override computer system, data stored at a transaction override database for user preferences stored in connection with the first account of the user;
identifying, by the transaction override trigger module, an override trigger among the user preferences associated with the first account of the user after the initial transaction authorization request has been denied by the issuer of the first account, the override trigger for payment transaction splitting between two or more payment accounts of the user when the first account is unable to tender a total payment amount in the initial transaction authorization request or when the total payment amount exceeds a predetermined threshold;
verifying user approval of payment transaction splitting, by the transaction override computer system, the verifying comprising:
sending, by a messaging and alert module in the transaction override computer system, a communication to a portable communication device of the user to verify user approval of payment transaction splitting instead of retuning returning a rejection
response to the merchant computer over the first communication path in response to the initial transaction authorization request, wherein the communication is sent to the portable communication device of the user via a second communication path that is different from the first communication path; and
receiving, by the messaging and alert module, an input from the portable communication device of the user indicating a transaction override approval from the portable communication device of the user via the second communication path, wherein the transaction override approval indicates approval for payment of a first partial payment amount of the total payment amount using the first account, and wherein the transaction override approval is generated automatically based on user preauthorization or the transaction override approval is provided by the user in response to an alert message sent to the user from the transaction override computer system;
in response to receiving the transaction override approval from the portable communication device of the user, splitting, by a split transaction management module in the transaction override computer system, the total payment amount into the first partial payment amount and at least a second partial payment amount;
transmitting, by the split transaction management module to the issuer of the first account, a request to authorize payment of the first partial payment amount using the first account;
requesting and receiving approval, by the messaging and alert module, for payment of the second partial payment amount of the total payment amount using a second account of the user, wherein the approval for payment of the second partial payment amount is obtained from the portable communication device;
transmitting, by the split transaction management module, a transaction override authorization request to an issuer of the second account of the user registered with the transaction override computer system in response to the approval for payment of the second partial payment amount received via the second communication path, wherein the transaction override authorization request includes a request to authorize payment of the second partial payment amount using the second account; and
transmitting, by the by the split transaction management module to the merchant computer, a response to the initial transaction authorization request based on a response received for the request to authorize payment of the first partial payment amount by the issuer of the first account and the response received for the transaction override authorization request by the issuer of the second account.

9. The method of claim 8 further comprising: receiving, at the transaction override computer system, a registration request associated with the first account; receiving, at the transaction override computer system, the transaction override approval associating the first account with the second account as part of a registration account setting; and storing, in a database, the transaction override approval.

10. The method of claim 9 wherein identifying, at the transaction override computer system, the transaction override approval by communicating a search request to the database and receiving a search response from the database indicating that the database contains the transaction override approval.

11. The method of claim 9 wherein the override trigger comprises a registration trigger setting received by the transaction override computer system.

12. The method of claim 11 wherein the registration trigger setting received by the transaction override computer system comprises a set of instructions to override a transaction and to perform payment splitting when the total payment amount exceeds a predetermined threshold amount.

13. The method of claim 8 wherein the override trigger comprises a determination, at the transaction override computer system, that an account balance associated with the first account is insufficient to approve the initial transaction authorization request associated with the first account.

14. The method of claim 8 further comprising: creating the second account in response to identifying the override trigger wherein the second account is an installment payment account.

15. The method of claim 14 further comprising:
communicating a request for a designation of a number of installment payments to the portable communication device associated with the first account; and
receiving a response designating the number of installment payments at the transaction override computer system.

* * * * *